(12) United States Patent
Choyi et al.

(10) Patent No.: US 11,509,476 B2
(45) Date of Patent: Nov. 22, 2022

(54) SYSTEM AND METHOD FOR ENABLING SECURE SERVICE-BASED COMMUNICATIONS VIA 5G PROXIES

(71) Applicant: Verizon Patent and Licensing Inc., Washington, DC (US)

(72) Inventors: Vinod Kumar Choyi, Conshohocken, PA (US); Hossein M. Ahmadi, Parsippany, NJ (US); Sudhakar Reddy Patil, Flower Mound, TX (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 353 days.

(21) Appl. No.: 16/788,477

(22) Filed: Feb. 12, 2020

(65) Prior Publication Data

US 2021/0250172 A1 Aug. 12, 2021

(51) Int. Cl.
*H04L 9/32* (2006.01)
*H04W 12/08* (2021.01)
*H04W 48/08* (2009.01)
*H04W 4/50* (2018.01)
*H04L 67/63* (2022.01)
*H04L 67/563* (2022.01)

(52) U.S. Cl.
CPC .......... *H04L 9/3213* (2013.01); *H04L 9/3239* (2013.01); *H04L 9/3247* (2013.01); *H04L 67/563* (2022.05); *H04L 67/63* (2022.05); *H04W 4/50* (2018.02); *H04W 12/08* (2013.01); *H04W 48/08* (2013.01)

(58) Field of Classification Search
CPC ..... H04L 9/3213; H04L 9/3239; H04L 9/324; H04L 9/70; H04L 9/3263; H04L 9/0832; H04L 67/2814; H04L 67/327; H04W 4/50; H04W 12/08; H04W 12/06; H04W 48/08
See application file for complete search history.

(56) References Cited

U.S. PATENT DOCUMENTS

| 2013/0160099 | A1* | 6/2013 | Fitzpatrick, III | H04L 9/3213 726/7 |
| 2016/0262021 | A1* | 9/2016 | Lee | H04L 63/0807 |
| 2018/0337784 | A1* | 11/2018 | Jain | H04W 12/084 |
| 2020/0267153 | A1* | 8/2020 | Kang | H04L 63/10 |
| 2022/0095111 | A1* | 3/2022 | Fu | H04L 63/0853 |

* cited by examiner

*Primary Examiner* — Khoi V Le

(57) ABSTRACT

Systems and methods enable secure service-based communications in networks that use a Services Communications Proxy (SCP). A Network Function (NF) producer receives a service request including an authorization token and a signed service request object, wherein the service request originates from an NF consumer of the wireless core network and is forwarded to the NF producer via the SCP. The NF producer verifies the signed service request object and generates, after the verifying, a service response. The service response includes a signed service response object. The NF producer sends, to the NF consumer and via the SCP, the service response with the signed service response object.

20 Claims, 11 Drawing Sheets

SYSTEM AND METHOD FOR ENABLING SECURE SERVICE-BASED COMMUNICATIONS VIA 5G PROXIES

BACKGROUND INFORMATION

In Fifth Generation (5G) core networks, for example, a Services Communications Proxy (SCP) is a network entity that enables communications between network functions (NFs). NF services may be communicated directly between NF consumers and NF producers, or indirectly via an SCP. The SCP additionally performs delegated discovery, message forwarding, delegated authorization, load balancing, monitoring and overload control.

DETAILED DESCRIPTION OF PREFERRED EMBODIMENTS

The following detailed description refers to the accompanying drawings. The same reference numbers in different drawings identify the same or similar elements.

Figure 1:
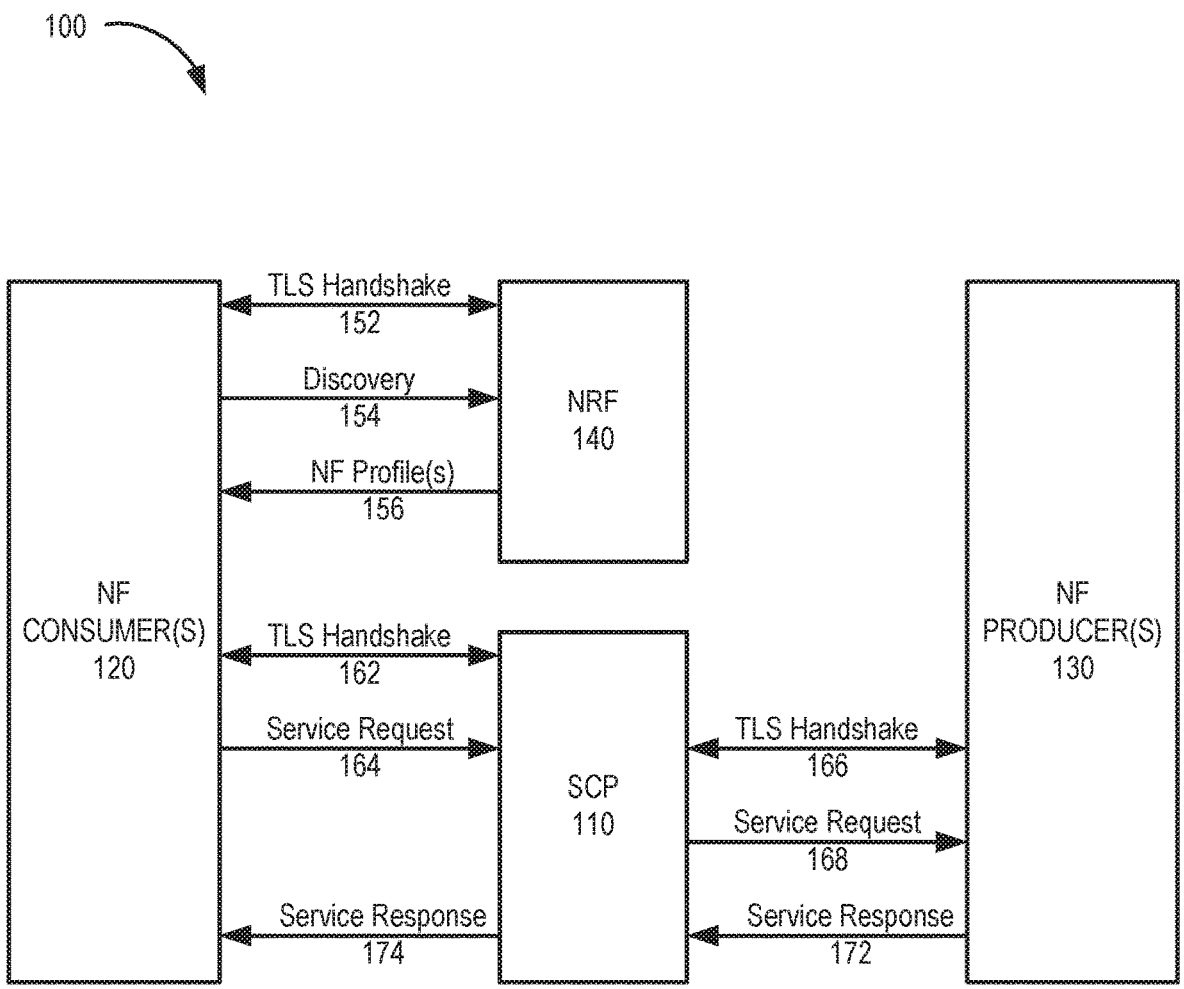
FIG. 1 is a diagram illustrating a network environment according to an implementation described herein.

FIG. 1 is a diagram of an exemplary environment 100 in which the systems and/or methods, described herein, may be implemented. FIG. 1 may represent network elements in a 5G core network. In the example, of FIG. 1, a Services Communications Proxy (SCP) 110 enables communications between various network nodes. The network function nodes may operate as network function (NF) consumers 120 and/or NF producers 130. For example, using SCP 110, NF consumers 120 may request services from NF producers 130.

As shown in FIG. 1, to request a service, an NF consumer 120 may conduct a Transport Layer Security (TLS) handshake 152 with network repository function (NRF) 140. NF consumer 120 may provide a discovery request 154 to NRF 140 and receive one or more NF profiles 156. NF consumer 120 may conduct a TLS handshake 162 with SCP 110. Based on the results that include NF profiles 156, NF consumer 120 may send a service request 164 to SCP 110 containing the address of the selected NF producer 130.

SCP 110 may conduct a TLS handshake 166 with NF producer 130. SCP 110 may then route the service request, shown as service request 168, to the selected NF producer 130 and obtain a service response 172 from NF producer 130. SCP 110 may then forward the service response, as service response 174, to NF consumer 120.

NF service authorization, such as may be specified in 5G network standards, can be performed by NRF 140 using policies that have been pre-provisioned. The authorization framework may use protocols such as OPEN AUTHENTICATION (e.g., OAuth 2.0) for client credentials grant. Access tokens, also referred to as authorization tokens, may be based on Java Script Object Notation (JSON) web tokens secured using digital signatures or Message Authentication Codes (MAC) based on JSON Web Signature (JWS).

The token may be provided to NF consumer 120 with a "subject" field having the fully qualified domain name (FQDN) of the NF consumer 120. However, this token is then presented to the NF producer 130 on behalf of NF consumer 120 by SCP 110. The NF producer 130 may have to blindly trust SCP 110, which may not be secure. It is possible for a misbehaving SCP 110 (e.g., malicious or non-malicious via configuration) to request services from an NF producer 130 using existing valid tokens without having a corresponding request from the NF consumer 120. In other words, the NF producer 130 may have complete trust in SCP 110, and this trust could be exploited.

Furthermore, a misbehaving SCP 110 may provide services to NF consumers 120 that may not have been authorized since the NF producer 130, on its own, may not be able to verify the NF consumer 120. Also, the SCP 110 may be able to eavesdrop on the contents of the communications between the NF consumer 120 and NF producer 130. Thus, an attacker that is able to break into an SCP 110 may be able to access sensitive information from SCP 110. This type of breach can be particularly problematic since the communications between the NF consumer 120 and NF producer 130 may include authentication data and sessions keys, such as those transported from an (AUSF) to an (AMF).

To address these security concerns, in systems and methods described herein, an NF consumer provides evidence to an NF producer using a signed request object that the NF producer can verify. The signed request object may also be sent by the NRF or SCP on behalf of the NF consumer. The NF producer generates an encrypted and signed object that contains the service response that the SCP (or any other entity) cannot decrypt, but that can be decrypted only by the NF consumer that requested the service. Thus, according to implementations described herein, NF producers would process only authorized and timely requests that have not been replayed.

According to an implementation, an NF producer receives a service request including an authorization token and a signed service request object, wherein the service request originates from an NF consumer of the wireless core network and is forwarded to the NF producer via the SCP. The NF producer verifies the signed service request object and generates, after the verification, a service response. The service response includes a signed service response object. The NF producer sends, to the NF consumer and via the SCP, the service response with the signed service response object.

Figure 2:
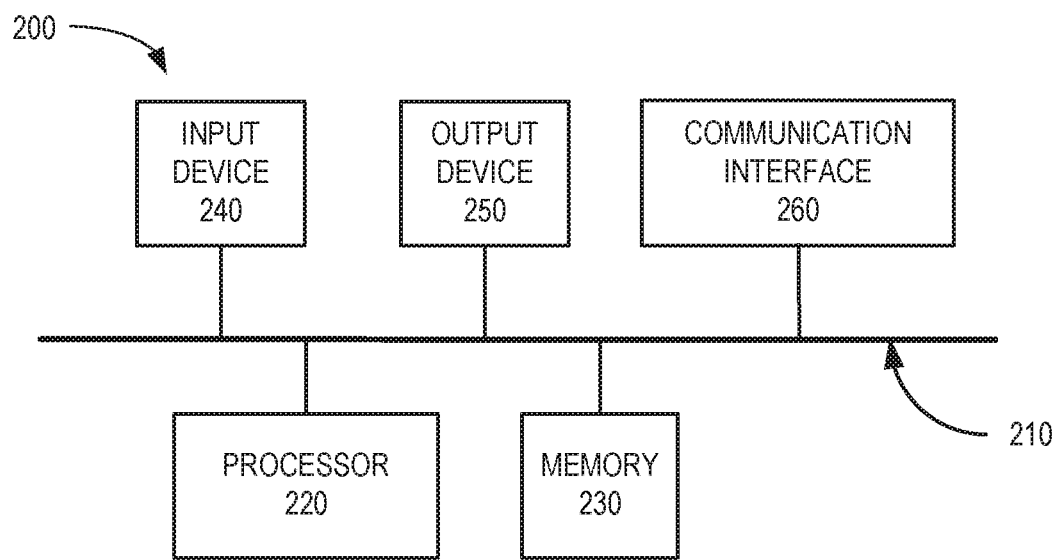
FIG. 2 is a diagram illustrating exemplary components of a device that may be included in a component of FIG. 1, according to an implementation described herein.

FIG. 2 is a diagram illustrating example components of a device 200 according to an implementation described herein. SCP 110, NF consumer 120, NF producer 130, NRF 140, and/or other components of network environment 100 may be implemented by one or more devices 200.

NF consumer 120 and NF producer 130 may correspond to the same or different types of network functions. For example, each of the following network functions may function as either NF consumer 120 or NF producer 130: an Access and Mobility Function (AMF), a User Plane Function (UPF), a Session Management Function (SMF), an Application Function (AF), a Unified Data Management (UDM), a Policy Control Function (PCF), a Charging Function (CHF), a Network Repository Function (NRF), a Network Exposure Function (NEF), a Network Slice Selection Function (NSSF), an Authentication Server Function (AUSF), a 5G Equipment Identity Register (EIR), a network data analytics function (NWDAF), or a Short Message Service Function (SMSF).

As shown in FIG. 2, device 200 may include a bus 210, a processor 220, a memory 230, an input device 240, an output device 250, and a communication interface 260. Bus 210 may include a path that permits communication among the components of device 200. Processor 220 may include any type of single-core processor, multi-core processor, microprocessor, latch-based processor, and/or processing logic (or families of processors, microprocessors, and/or processing logics) that interprets and executes instructions. In other embodiments, processor 220 may include an application-specific integrated circuit (ASIC), a field-programmable gate array (FPGA), and/or another type of integrated circuit or processing logic.

Memory 230 may include any type of dynamic storage device that may store information and/or instructions, for execution by processor 220, and/or any type of non-volatile storage device that may store information for use by processor 220. For example, memory 230 may include a random access memory (RAM) or another type of dynamic storage device, a read-only memory (ROM) device or another type of static storage device, a content addressable memory (CAM), a magnetic and/or optical recording memory device and its corresponding drive (e.g., a hard disk drive, optical drive, etc.), and/or a removable form of memory, such as a flash memory.

Input device 240 may allow an operator to input information into device 200. Input device 240 may include, for example, a keyboard, a mouse, a pen, a microphone, a remote control, an audio capture device, an image and/or video capture device, a touch-screen display, and/or another type of input device. In some embodiments, device 200 may be managed remotely and may not include input device 240. In other words, device 200 may be "headless" and may not include a keyboard, for example.

Output device 250 may output information to an operator of device 200. Output device 250 may include a display, a printer, a speaker, and/or another type of output device. For example, device 200 may include a display, which may include a liquid-crystal display (LCD) for displaying content to the customer. In some embodiments, device 200 may be managed remotely and may not include output device 250. In other words, device 200 may be "headless" and may not include a display, for example.

Communication interface 260 may include a transceiver that enables device 200 to communicate with other devices and/or systems via wireless communications (e.g., radio frequency, infrared, and/or visual optics, etc.), wired communications (e.g., conductive wire, twisted pair cable, coaxial cable, transmission line, fiber optic cable, and/or waveguide, etc.), or a combination of wireless and wired communications. Communication interface 260 may include a transmitter that converts baseband signals to radio frequency (RF) signals and/or a receiver that converts RF signals to baseband signals. Communication interface 260 may be coupled to one or more antennas/antenna arrays for transmitting and receiving RF signals.

Communication interface 260 may include a logical component that includes input and/or output ports, input and/or output systems, and/or other input and output components that facilitate the transmission of data to other devices. For example, communication interface 260 may include a network interface card (e.g., Ethernet card) for wired communications and/or a wireless network interface (e.g., a WiFi) card for wireless communications. Communication interface 260 may also include a universal serial bus (USB) port for communications over a cable, a Bluetooth™ wireless interface, a radio-frequency identification (RFID) interface, a near-field communications (NFC) wireless interface, and/or any other type of interface that converts data from one form to another form.

As will be described in detail below, device 200 may perform certain operations relating to enabling secure service-based communications in networks that use a SCP. Device 200 may perform these operations in response to processor 220 executing software instructions contained in a computer-readable medium, such as memory 230. A computer-readable medium may be defined as a non-transitory memory device. A memory device may be implemented within a single physical memory device or spread across multiple physical memory devices. The software instructions may be read into memory 230 from another computer-readable medium or from another device. The software instructions contained in memory 230 may cause processor 220 to perform processes described herein. Alternatively, hardwired circuitry may be used in place of, or in combination with, software instructions to implement processes described herein. Thus, implementations described herein are not limited to any specific combination of hardware circuitry and software.

Although FIG. 2 shows exemplary components of device 200, in other implementations, device 200 may include fewer components, different components, additional components, or differently arranged components than depicted in FIG. 2. Additionally, or alternatively, one or more components of device 200 may perform one or more tasks described as being performed by one or more other components of device 200.

Figure 3:
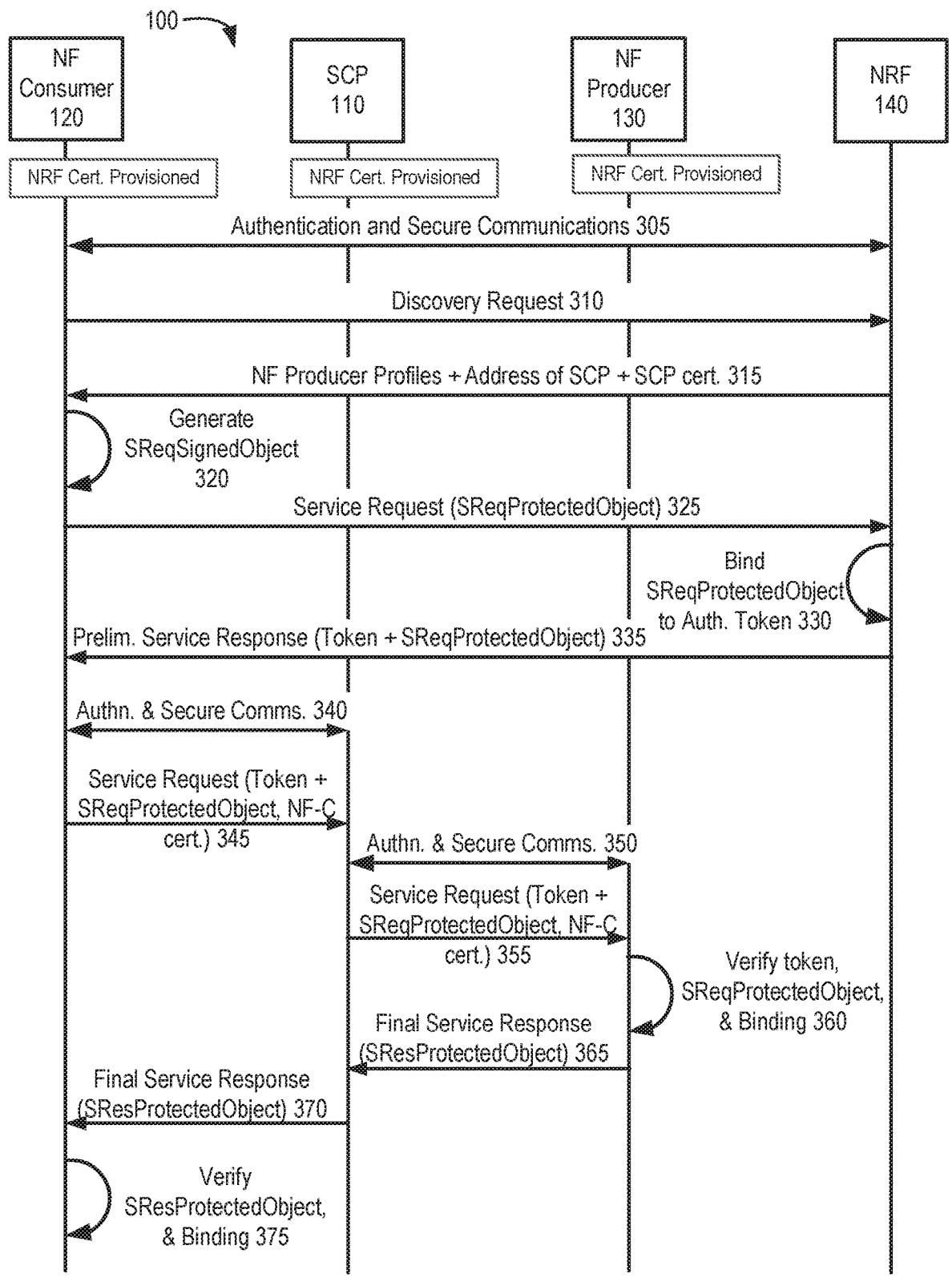
FIG. 3 is a signal flow diagram illustrating exemplary communications to enable secure service-based communications via a Services Communications Proxy (SCP), according to an implementation described herein.

FIG. 3 is a signal flow diagram illustrating exemplary communications in network environment 100 to have an NF consumer provide evidence of a service request to an NF producer. Assume in FIG. 3 that each of SCP 110, NF consumer 120, and NF producer 130 have been provisioned with an NRF certificate (e.g., an X.509v3 certificate including the NRF's public key) to enable cryptographic exchanges. Communications shown in FIG. 3 may provide simplified illustrations of communications in network environment 100 and are not intended to reflect every signal or communication exchanged between devices/functions. For example, communications described in FIG. 3 may be implemented via a subscription-notification model or a request-response model.

As shown in FIG. 3, NF consumer 120 may initiate authentication and secure communications with NRF 140, as indicated at reference 305. For example, NF consumer 120 and NRF 140 may conduct a TLS handshake and NRF 140 may verify a certificate for NF consumer 120 using, for example, a trusted authority (TA).

After registration, NF consumer 120 may submit a discovery request 310 to NRF 140. In response to discovery request 310, NRF 140 may return a discovery response 315 including, for example, one or more NF profiles (which may correspond to NF producer 130), a network address of one or more SCP(s) 110, and associated SCP certificate(s).

Upon receiving discovery response 315, NF consumer 120 may create a proof-of-request that is cryptographically signed by NF consumer 120. More particularly, as shown at reference 320, NF consumer 120 may create a service request (SReq) message, generate a hash of the service request, and digitally sign the hash to generate a cryptographically signed service request object (SReqProtectedObject). Creation of the proof-of-request is described further in connection with FIG. 4A below. NF consumer 120 may include the proof-of-request (e.g., SReqProtectedObject) in a service request 325 directed to NRF 140.

NRF 140 may receive service request 325 and bind the corresponding SReqProtectedObject to one or more authorization tokens. More particularly, as shown at reference 330, NRF 140 may verify policies and authorization rules and (optionally) verify the SReqProtectedObject. NRF 140 may generate one or more authorization token (e.g., an encrypted data string with a time stamp) and bind the token(s) to the SReqProtectedObject. NRF 140 may include the token(s) and SReqProtectedObject in a service response 335 directed to NF consumer 120. The NRF 140 may generate the authorization tokens based on authorization policies.

Using information from discovery response 315, at reference 340, NF consumer 120 may initiate a TLS handshake to conduct authentication and establish secure communications with SCP 110. NF consumer 120 may submit a service request 345 to SCP 110. Service request 345 may also include the one or more tokens and SReqProtectedObject previously received from NRF 140, along with the NF consumer's digital certificate. It is assumed that the NF consumer 120, NF producer 130, the NRF 140 and the SCP 110 all share the same trust anchor.

Based on service request 345, SCP 110 may, at reference 350, initiate a TLS handshake to conduct authentication and establish secure communications with NF producer 130. Acting as a proxy for NF consumer 120, SCP 110 may submit or forward the received service request 355 to NF producer 130. Service request 355 may also include one of the tokens and SReqProtectedObject received from NF consumer 120, along with the NF consumer's certificate. According to an implementation, if multiple NF producers 130 are selected to handle a service request, SCP 110 may provide to each of the multiple NF producers 130 (not shown in FIG. 3) a service request with the SReqProtectedObject and a different token (e.g., from the multiple tokens originated at reference 340), along with the NF consumer's certificate.

NF producer 130 may receive service request 355. NF producer 130 is able to verify that the proof-of-request (e.g., the SReqProtectedObject) was indeed created by NF consumer 120 by verifying the NF consumer's 120 digital signature and verifying the authorization provided by the authorization token binding. More particularly, as shown at reference 360, NF producer 130 may verify the authenticity of the token, verify the SReqProtectedObject, verify the binding, and generate a signed service response object (SResProtectedObject) that includes a binding to the service response Similar to the SReqProtectedObject, the SResProtectedObject may be generated using a hash of the service response parameters and a digital signature based on a private key of NF producer 130.

NF producer 130 may include the SResProtectedObject in a service response 365 directed to SCP 110. SCP 110 may receive service response 365 and may submit a service response 370, including the SResProtectedObject, to NF consumer 120. NF consumer 120 may receive service response 370 and may verify the SResProtectedObject for authenticity and verify the binding, as shown in reference 375.

Although FIG. 3 shows exemplary communications in network environment 100, in other implementations, network environment 100 may include additional components, different components, additional components, or differently arranged components than depicted in FIG. 3. For example, in another implementation, multiple SCPs 110 may be included in network environment 100, with service requests from NF consumer 120 possibly traversing multiple SCP hops before reaching NF producer 130. Thus, token information may include, for example, information for each SCP hop and FQDNs for each SCP 110 along a service request path.

Figure 4A:
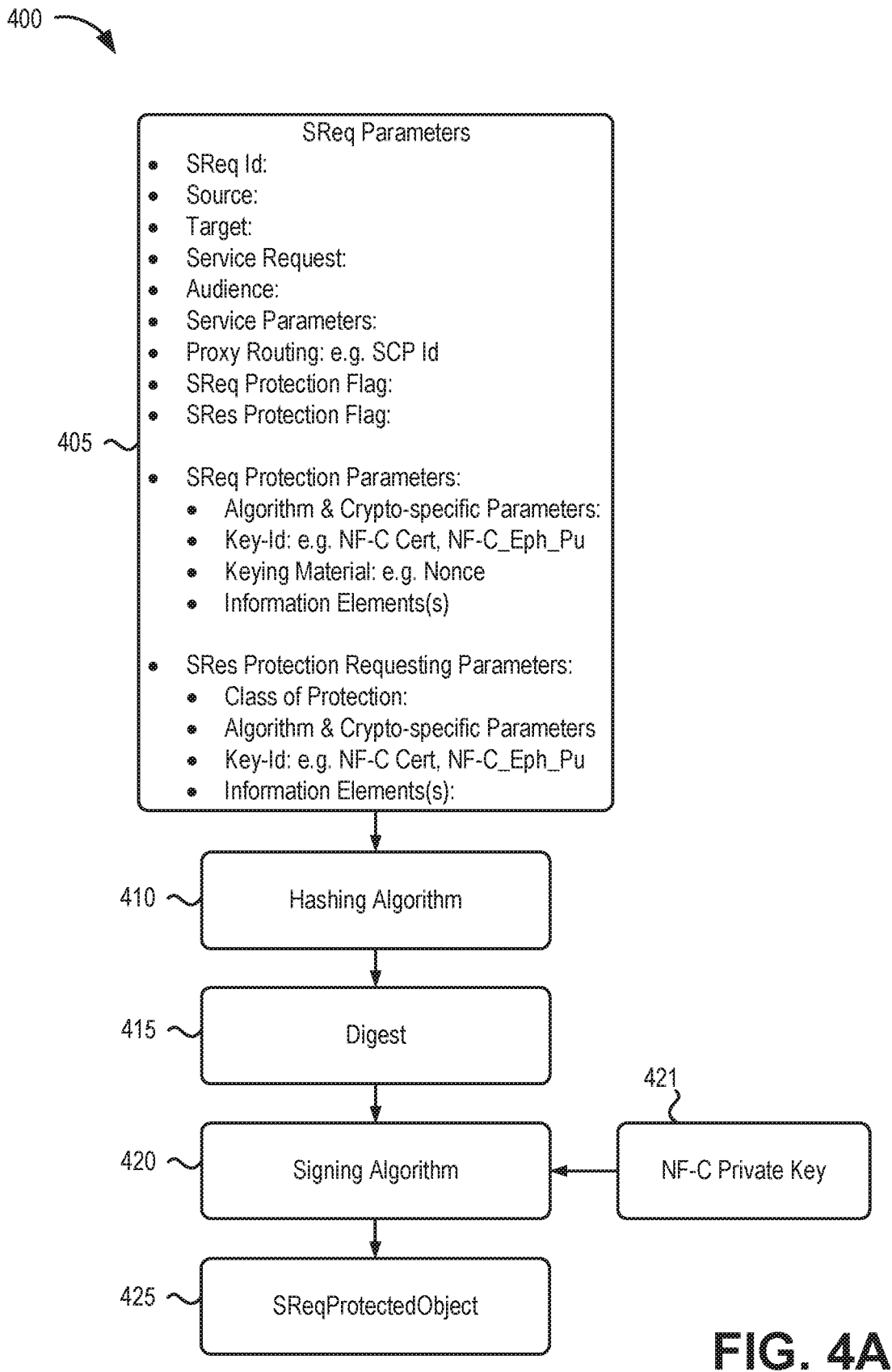
FIG. 4A is a flow diagram for a process of creating a proof-of-request, according to an implementation described herein.
Figure 4B:
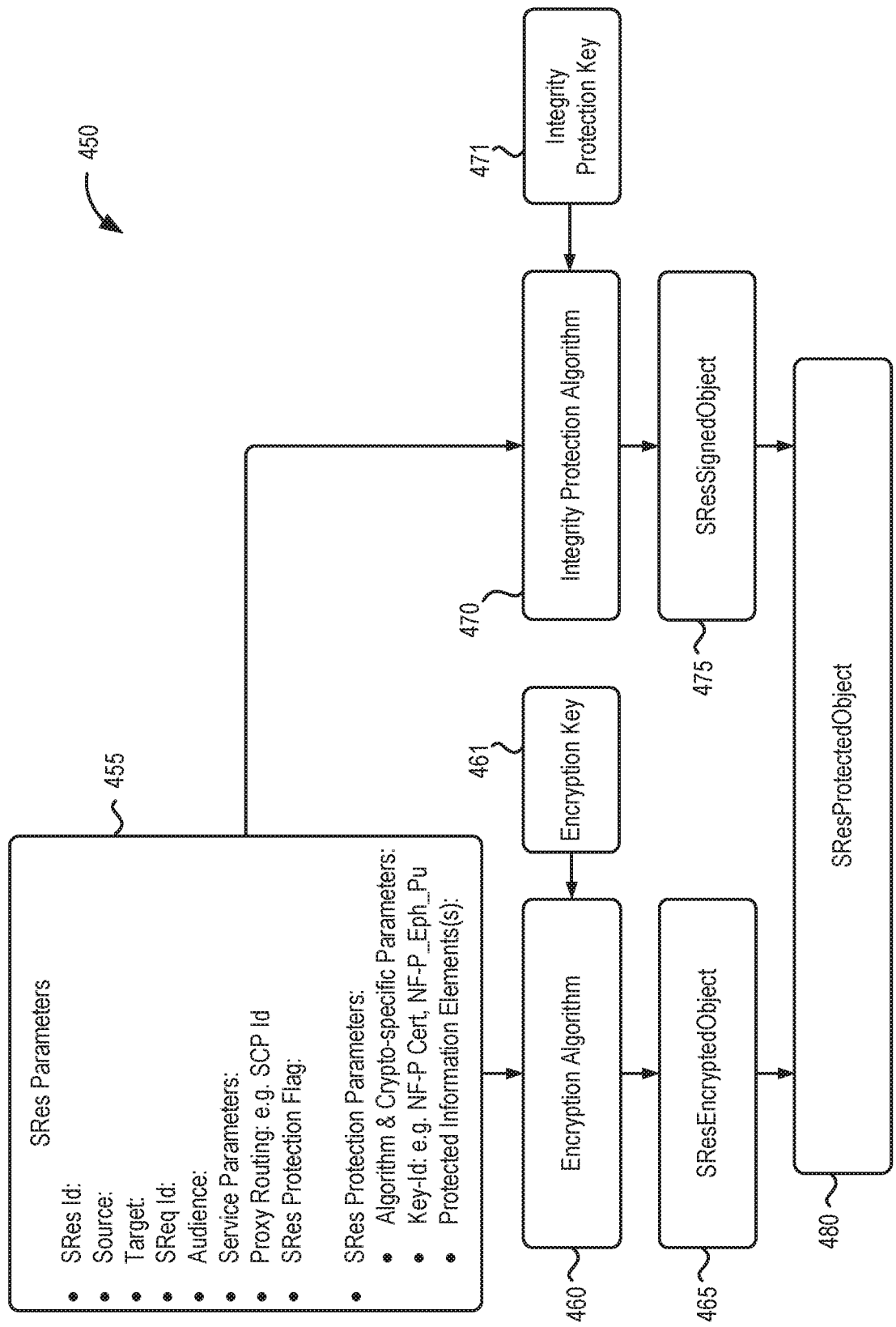
FIG. 4B is a flow diagram for a process of creating a proof-of-response, according to an implementation described herein.

FIGS. 4A and 4B describe processes for creating cryptographically signed service objects (e.g., SReqProtectedObject and SResProtectedObject), which may be used in the communications of FIG. 3 and other figures described herein. FIG. 4A is a flow diagram for a process 400 of creating a proof-of-request according to an implementation. Process 400 may correspond to process block 320 of FIG. 3 and may be performed, for example, by NF consumer 120. As shown in step 405 of FIG. 4A, NF consumer 120 may assemble a service request (SReq) including, for example, the following parameters: a SReq ID, a source (e.g., the FQDN for NF consumer 120), a target (e.g., the FQDN for NRF 140), a service request (e.g., create, retrieve, update or delete a resource relating to services offered by a particular network service: an NF type="AUSF"), an audience (e.g., FQDN of NF Producer 130 or one more instances of the NF Producer), information about routing via a proxy (e.g., SCP) and associated SCP's network address (e.g., FQDN) may also be provided. Other parameters (e.g., time of request, validity of request) may also be included as part of the "Service Parameters." The SRes Parameters may include a SReq Protection flag and/or a SRes Protection flag to indicate if the respective protection is provided by the NF consumer or required by the NF consumer from the NF producer. The SReq Parameters may optionally include one or more proxy routing network address (e.g., FQDN or IP address of SCP 110). The SReq parameters may further include one or more SReq Protection Parameters. If the protection parameters have been pre-provisioned as part of an orchestration procedure, updated by operations or management procedures, then only a subset of the protection parameters may be included in the SReq message. The SReq Protection Parameters may include details on the one or more protection algorithms that have been used to create the SReqProtectedObject. The algorithms and crypto-specific parameters may include algorithms used for generation of digital signature (e.g., elliptic-curve digital signature algorithm (ECDSA), and one or more hashing algorithms (e.g., SHA-256)). Optionally, a key agreement algorithm (e.g. elliptic curve integrated encryption scheme (ECIES)) and associated profiles (e.g., Curve25519), and associated integrity function (e.g., HMAC-SHA-256), encryption algorithm (e.g., AES-256), along with initialization vector and hashing algorithm (e.g., SHA-256) and associated parameters are provided. The SReq Protection Parameters may also include one or more Key-Id (e.g., NF consumer certificate, ephemeral public key generated by the NF consumer) and one or more keying material (e.g., a random Nonce). The SReq Protection parameters may also provide zero or more list of information elements that may be protected and type of protection for each information element. The SReq Parameters list may also contain SRes Protection Requesting Parameters. If the SRes Protection Requesting parameters have been pre-provisioned as part of an orchestration procedure, updated by operations or management procedures, then only a subset of the protection parameters may be included in the SReq message. These parameters may be used by the NF producer 130 to protect the service response sent by the NF producer 130. The SRes Protection Requesting Parameter list may also provide a list one or more sensitive information element(s) or data that requests protection and the type of protection that may be required (e.g. encryption and integrity protection). The SRes Protection Requesting Parameter list may also optionally list the level(s) of protection for each of the one or more information element associated with the service that is requested by the NF consumer 120. The levels may be qualitative (e.g. high/medium/low). It may also explicitly list the type/class or explicit list of cryptographic algorithm to be used for protection, cryptographic seed or initialization vector to be used.

In step 410, NF consumer 120 may apply a hashing algorithm to the service request (SReq). "Hashing," as referred to herein, may include the process of translating or mapping a string of bits of any length into another string of a fixed length, based on a mathematical algorithm or a function (herein referred to as a "hash function" or "cryptographic hash function"). As an example, the hashing algorithm, SHA-256 that may be used is listed within the SReq Protection Parameters as one of the cryptographic algorithm used for hashing. For example, in step 410, NF consumer 120 may apply an SHA-256 hash function to the SReq of step 405. NF consumer 120 may use the hash function to generate a hash digest in step 415.

In step 420, NF consumer 120 may use its private key 421 to digitally sign the hash digest that corresponds to the service request object to create a signed service request object, SReqProtectedObject. For example, NF consumer 120 may apply its private key to a signing algorithm, such as an Elliptic Curve Digital Signature Algorithm (ECDSA). The ECDSA algorithm is listed within the SReq Protection Parameters as the Algorithm used for generating the digital signature. The result of the signing algorithm, as shown in step 425, may be the proof-of-request, the SReqProtectedObject.

FIG. 4B is a flow diagram for a process 450 of creating a signed service response object according to an implementation. Process 450 may correspond to process block 365 of FIG. 3 and may be performed, for example, by NF producer 130.

As shown in step 455 of FIG. 4B, NF producer 130 may assemble a service response (SRes) including, for example, the following parameters: a SRes ID, a source (e.g., the FQDN for NF producer 120), a target (e.g., the SCP 110 or NF Consumer 120), a SReq ID (e.g., corresponding to the SReq ID of step 405), an audience (e.g., FQDN of NF Consumer 120), Service Parameters, Proxy Routing, and a SRes Protection Flag as described above for the SReq of step 405. The SRes Protection Parameters may include details on the one or more protection algorithms that have to be used by the NF producer 130 to create the SResProtectedObject. The algorithms and crypto-specific parameters may include algorithms used for generation of digital signature (e.g., ECDSA), and one or more hashing algorithms (e.g., SHA-256). Optionally, a key agreement algorithm (e.g., ECIES and associated profiles (e.g., Curve25519), and associated integrity function (e.g., HMAC-SHA-256), encryption algorithm (e.g., AES-256), along with initialization vector hashing algorithm (e.g., SHA-256)) and associated parameters are provided. The SRes Protection Parameters may also include one or more Key-Id (e.g., NF-C certificate, ephemeral public key generated by the NF consumer 120) that may be used by the NF producer 130 for authentication and/or key generation keys (e.g., when using key agreement protocols e.g., ECIES) and one or more keying material (e.g., a random Nonce). One or more of the parameters used for generating a SResProtectedObject may be dependent upon parameters that may have been provided within the SReq Paramqeters list by the NF consumer 120 by way of SRes Protection Requesting Parameters (e.g. algorithm, algorithm type, crypto-specific parameters, key length, Key-Id) list or by using zero or more parameters that may have been pre-provisioned to the NF-P. The SRes Protection Parameters that is used for creation of the SResProtetedObject by the NF producer 130 may have been pre-provisioned to the NF Producer 130 or communicated to the NF producer 130 by the NF consumer 120 as part of the SRes ProtectionRequesting Parameter list.

In step 460, NF producer 130 may apply an encryption algorithm to the service response (SRes) using an algorithm identified in the SRes Protection Parameters of step 455. NF producer 130 may use the selected algorithm, applying a stored encryption key 461, to generate SResEncryptedObject in step 465. In step 470, NF producer 130 may apply an integrity protection algorithm to the service response (SRes) using an algorithm identified in the SRes Protection Parameters of step 455. NF producer 130 may use the selected algorithm, applying a stored integrity protection key 471, to generate a SResSignedObject in step 475. In step 480, and as described in more detail in connection with FIG. 5, the SResEncryptedObject (of step 465) and the SResSignedObject may be combined or concatenated as the SResProtectedObject.

Figure 5:
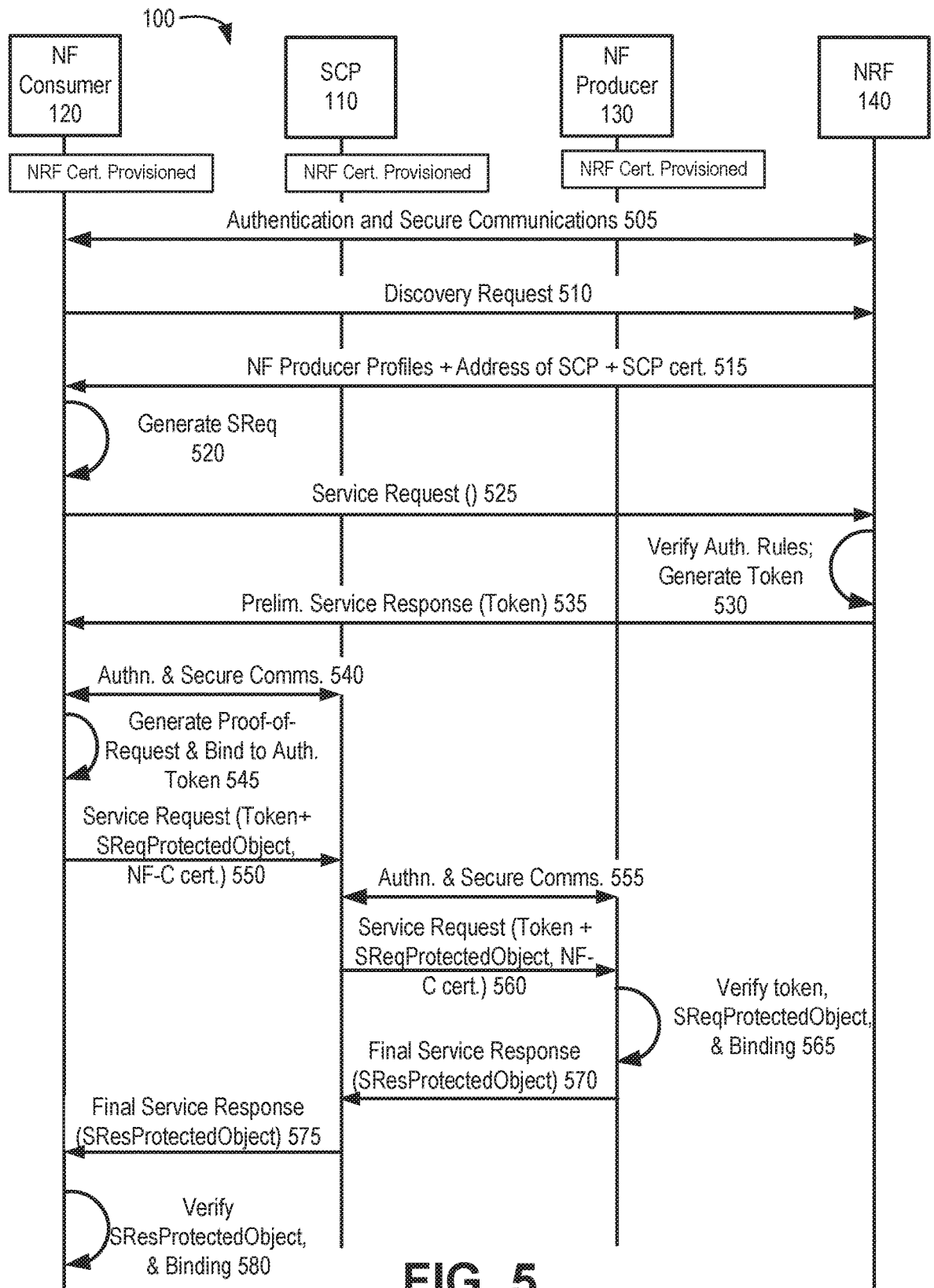
FIG. 5-9 are a signal flow diagram illustrating exemplary communications to enable secure service-based communications via an SCP, according to other implementation described herein.

FIG. 5 is a signal flow diagram illustrating exemplary communications in network environment 100 to have an NF consumer provide evidence of a service request, according to another implementation. In contrast with the communications of FIG. 3, in FIG. 5, NF consumer 120 generates and provides a proof-of-request and binds it with an authorization token that is generated by NRF 140. Similar to FIG. 3, assume in FIG. 5 that each of SCP 110, NF consumer 120, and NF producer 130 have been provisioned with an NRF certificate to enable cryptographic exchanges. Additionally, the NF consumer 120, NF producer 130, SCP 110, and the NRF 140 have been pre-provisioned with their corresponding digital certificate (e.g., X.509v3) that has been issued by a common trust anchor (e.g., a common trust anchor). Communications shown in FIG. 5 may provide simplified illustrations of communications in network environment 100 and are not intended to reflect every signal or communication exchanged between devices/functions.

As shown in FIG. 5, NF consumer 120 may initiate authentication and secure communications with NRF 140, as indicated at reference 505. After registration, NF consumer 120 may submit a discovery request 510 to NRF 140. In response to discovery request 510 NRF 140 may return a discovery response 515 including one or more NF producer profiles, network address of one or more SCP(s) 110, and associated one or more SCP certificate(s).

Upon receiving discovery response 515, NF consumer 120 may create a service request (SReq) message 520. NF consumer 120 may send the service request message to NRF 140, as indicated at reference 525. NRF 140 may receive service request 525. As shown at reference 530, NRF 140 may verify the authorization and policy rules and generate an authorization token. NRF 140 may include the token in a service response 535 directed to NF consumer 120. If the NRF determines that communications between the NF-C 120 and the NF-P 130 has to be sent via a SCP 110, then the network address (e.g. FQDN or IP address) of the SCP 110 is included as part of the token. The token here is assumed to be conformant to standards (e.g., IETF RFC 7515 and RFC 7519) and may be digitally signed by the NRF 140 based on standards (e.g. JSON Web Signature specifications). The NRF 140 may also include network information (e.g. FQDN or IP address associated with SCP 110) about one or more proxies that may be have to be traversed so that the NF consumer 120 can send the service request to the appropriate NF producer 130 within the access token. The proxy information that may be included within the access token may list the order of network traversal (e.g. NF consumer 120→SCP1→SCP2→NF producer 130), SCP network address (e.g. FQDN associated with each SCP 110) and optionally the digital certificates associated each of the SCP 110.

Using information from discovery response 515, at reference 540, NF consumer 120 may initiate a TLS handshake to conduct authentication and establish secure communications with SCP 110. The NF consumer 120 may select the SCP 110 from the list of SCPs sent by the NRF 140. The NF consumer 120 may use the SCP certificate that has been pre-provisioned or provided by the NRF 140 in order to authenticate and establish secure communications with the SCP 110 as part of the TLS handshake. NF consumer 120 may create a proof-of-request that is cryptographically signed by NF consumer 120 using its private key that has an associated public key within the NF consumer's digital certificate and bind the proof-of-request to the authorization token (e.g., received from NRF 140 in service response 535. More particularly, as shown at reference 545, NF consumer 120 may generate a hash of the service request (e.g., SReq 520) and digitally sign the hash to generate a cryptographically signed service request object (SReqProtectedObject) using an algorithm and cryptographic parameters listed in the SReq Protection Parameter list. Similarly for the protection required of the NF-P 130 by the NF-C 120, the parameters are listed within the SRes Protection Parameters. NF consumer 120 may bind the authorization token (e.g., from service response 535) to the proof-of-request (e.g., SReqProtectedObject).

NF consumer 120 may submit a service request 550 to SCP 110. Service request 550 may also include the authorization token and SReqProtectedObject, along with an NF consumer 120 certificate. The service request message may be sent to the SCP 110, whose network address (e.g., FQDN or IP address) may be listed within the access token generated by the NRF 140 and/or listed within the SReq Parameters. Based on service request 550, SCP 110 may, at reference 555, initiate a TLS handshake to conduct authentication and establish secure communications with NF producer 130. The SCP 110 obtains the address of the next hop of the connection by using either the "audience" field within the authorization token or the "target" field within the service request to initiate the TLS connection. Acting as a proxy for NF consumer 120, SCP 110 may submit or forward a service request 560 to NF producer 130. Service request 555 may also include the token and SReqProtectedObject received from NF consumer 120, along with the NF consumer 120 certificate.

NF producer 130 may receive service request 560. NF producer 130 is able to verify that the proof-of-request was indeed created by NF consumer 120 by verifying the NF consumer's 120 digital signature and verifying the authorization token binding, thereby preventing an intermediate proxy from fraudulently attempting to mimic an authorized NF consumer. More particularly, as shown at reference 565, NF producer 130 may verify the authenticity of the token, verify the SReqProtectedObject, verify the binding, and generate a signed service response object (SResProtectedObject) that includes a binding to the service request. The NF producer 130 may be able to verify the authenticity and integrity of the SReq Parameters by using the SReq Parameter Protection parameters and may optionally decrypt information elements if the one or more information elements were encrypted. The SResProtectedObject may be created in a similar manner as the SReqProtectedObject, wherein the service response parameters (SRes Parameters) may contain the "source" field contains the network address (e.g., Fully Qualified Domain Name or IP address) of the NF Producer 130, the "target" field contains the network address of the SCP 110 or the NF consumer's 120 network address. The "Service Request" parameter may contain the unique identity of the "Service Request identity" received from the service request message 550, while the "Audience" field may contain the network address of the NF consumer 120. Additional "Service Parameters" parameter may include field that indicates if there are additional service response messages (e.g. subscribe notify type messages) that can be expected from the NF Producer 130. Additionally the SRes parameters may contain other parameters (e.g. time of response, validity of response, sensitive information element(s) or data that has been encrypted, level of security protection: high/medium/low, type/class or explicit cryptographic algorithm(s) that has been used for protection, cryptographic seed or initialization vector that has been used) and may also contain the NF Producer 130 digital certificate.

NF producer 130 may include the SResProtectedObject in a service response 570 directed to SCP 110. The NF producer 130 may send the service response messages that may contain the service response message containing the parameters: "source", "target", "audience", "NF-P certificate", "Service Parameters", "Service Request" and the SResProtectedObject to the SCP 110. SCP 110 may receive service response 570 and may submit or forward a service response 575, including the SResProtectedObject, to NF consumer 120. NF consumer 120 may receive service response 575 and may verify the SResProtectedObject for authenticity and verify the binding, as shown in reference 580 using the NF producer's certificate.

Thus, in the configuration of FIG. 5, NF consumer 120 creates a cryptographically signed service request object (SReqProtectedObject) which it sends to NF producer 130 via SCP 110. NF consumer 120 binds the SReqProtectedObject to the authorization token. The service request can be validated by NF producer 130 or a trusted SCP 110 (as described later herein). An untrusted SCP 110, as described in FIG. 5, cannot inspect or can only partially inspect or construct the signed service request object, lacking the ability to completely decrypt it, and therefore cannot attempt to mislead the NF producer 130 into generating a response for a fraudulent consumer.

Figure 6:
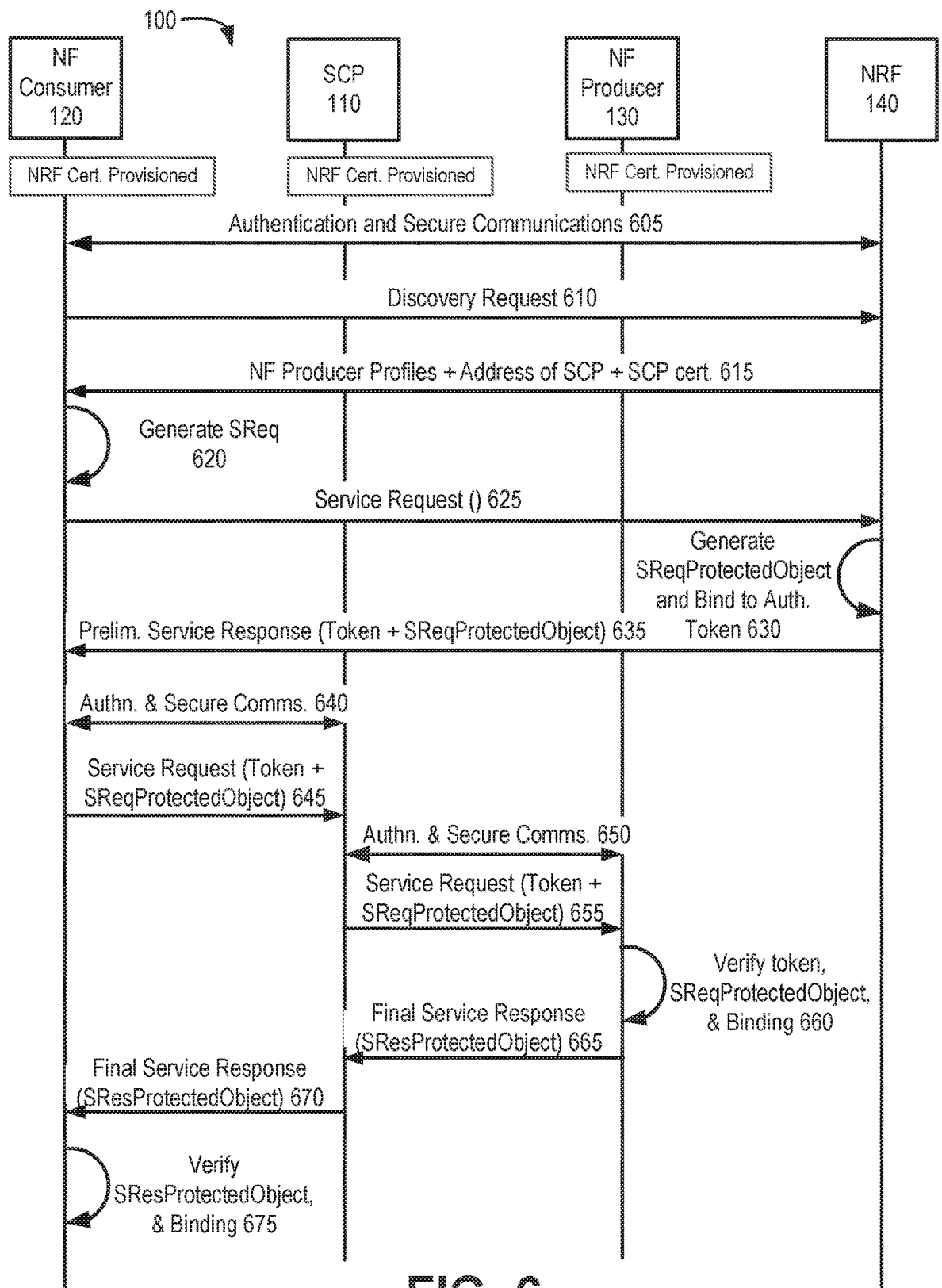

FIG. 6 is a signal flow diagram illustrating exemplary communications in network environment 100 to provide evidence of a service request, according to another implementation. In FIG. 6, NRF 140 generates a proof-of-request and binds it with an authorization token. Similar to FIG. 3, assume in FIG. 6 that each of SCP 110, NF consumer 120, and NF producer 130 have been provisioned with an NRF certificate to enable cryptographic exchanges. Communications shown in FIG. 6 may provide simplified illustrations of communications in network environment 100 and are not intended to reflect every signal or communication exchanged between devices/functions.

As shown in FIG. 6, NF consumer 120 may initiate authentication and secure communications with NRF 140, as indicated at reference 605. After registration, NF consumer 120 may submit a discovery request 610 to NRF 140. In response to discovery request 610, NRF 140 may return a discovery response 615 including one or more NF producer profiles, a network address of an SCP 110, and an SCP certificate.

Upon receiving discovery response 615, NF consumer 120 may create a service request (SReq) message 620. NF consumer 120 may send the service request message to NRF 140, as indicated at reference 625. The NF consumer 120 may send the discovery request 610 message and may also include a service request message 625 to the NRF 140 as part of the same message instead of sending two separate messages. The NF consumer 120 may only send the SReq parameters without including the SReq Protected Parameters, or the SRes Protection Requesting Parameters to the NRF 140.

NRF 140 may receive service request 625. NRF 140 may generate the proof-of-request on behalf of NF consumer 120 and bind it to an authorization token using the parameters SReq Parameters sent by the NF consumer 120. More particularly, as shown at reference 630, NRF 140 may verify the authorization and policy rules, generate a hash of the service request (e.g., SReq 625) and digitally sign the hash to generate a cryptographically signed service request object (SReqProtectedObject) by using the NRF's 140 private key associated with the NRF's 140 pre-provisioned certificate. NRF 140 may also generate an authorization token and bind the authorization token to the proof-of-request (e.g., SReqProtectedObject). NRF 140 may include the token and SReqProtectedObject in a service response 635 directed to NF consumer 120. The NRF may include only the relevant parameters within SReq Parameter list to create the SReqProtectedObject based on policies. Alternatively, the NRF 140 may only create an authorization token containing custom claims that also includes a subset of the SReq Parameters sent by the NF consumer 120 instead of creating a separate SReqProtectedObject and only sends the authorization token to NF consumer 120. Since the SReqProtectedObject is generated by the NRF 140, it may contain NRF's 140 chosen SReq Protected Parameter as well as SRes Protection Requesting Parameters. The NRF 140 may choose to modify the parameters based on policies, current load and network reachability info and also taking into consideration risk and capabilities associated with the NF producer 130.

Using information from discovery response 615, at reference 640, NF consumer 120 may initiate a TLS handshake to conduct authentication and establish secure communications with SCP 110. NF consumer 120 may submit a service request 645 to SCP 110. Service request 645 may also include the token and SReqProtectedObject previously received from NRF 140. If the NF consumer 120 received only an authorization token from the NRF 140 then it may only submit the authorization token to the SCP 110 as part of the service request message without the SReqProtectedObject. If only the authorization token is sent then it may also contain information obtained or created by the NRF 140 that pertains to the SReq message and/or SReq parameter list sent by the NF consumer to the NRF 140.

Based on service request 645, SCP 110 may, at reference 650, initiate a TLS handshake to conduct authentication and establish secure communications with NF producer 130. Acting as a proxy for NF consumer 120, SCP 110 may submit a service request 655 to NF producer 130. Service request 655 may include the SReqParameters, the token and SReqProtectedObject received from NF consumer 120. If the SCP 110 received only an authorization token from the NF consumer 120 then it may only submit the authorization token to the NF producer 130 as part of the service request message without the SReqProtectedObject.

NF producer 130 may receive service request 655. NF producer 130 is able to verify that the proof-of-request was indeed created by NF consumer 120 by verifying the NRF's 140 digital signature in the SReqProtectedObject and verifying the authorization token binding. More particularly, as shown at reference 660, NF producer 130 may verify the authenticity of the token, verify the SReqProtectedObject, verify the binding, and generate a signed service response object (SResProtectedObject) that is bound to the service request (SReq). If the NF producer 130 received only an authorization token from the SCP 110 then it may verify the authenticity of the authorization token using the NRF's 140 pre-provisioned public key or certificate. The NF producer may also verify that the service was indeed requested by the NF consumer 120 by verifying the claims within the token that may contain information from the original SReq Parameters (e.g. Source, Target, SReq Id, Date/Time, SReq Protection Parameters containing the NF consumer's 120 certificate) sent by the NF consumer 120 and based on complete trust that the NF producer 130 has on the NRF 140.

NF producer 130 may include the SResProtectedObject in a service response 665 directed to SCP 110. SCP 110 may receive service response 665 and may submit a service response 670, including the SResProtectedObject, to NF consumer 120. NF consumer 120 may receive service response 670 and may verify the SResProtectedObject for authenticity and verify the binding, as shown in reference 675.

Thus, in the configuration of FIG. 6, NRF 140 creates a cryptographically signed service request object (SReqProtectedObject) and binds the SReqProtectedObject to the authorization token. NF consumer 120 eventually sends to NF producer 130 via SCP 110. The service request can be validated by NF producer 130 and the SCP 110.

Figure 7:
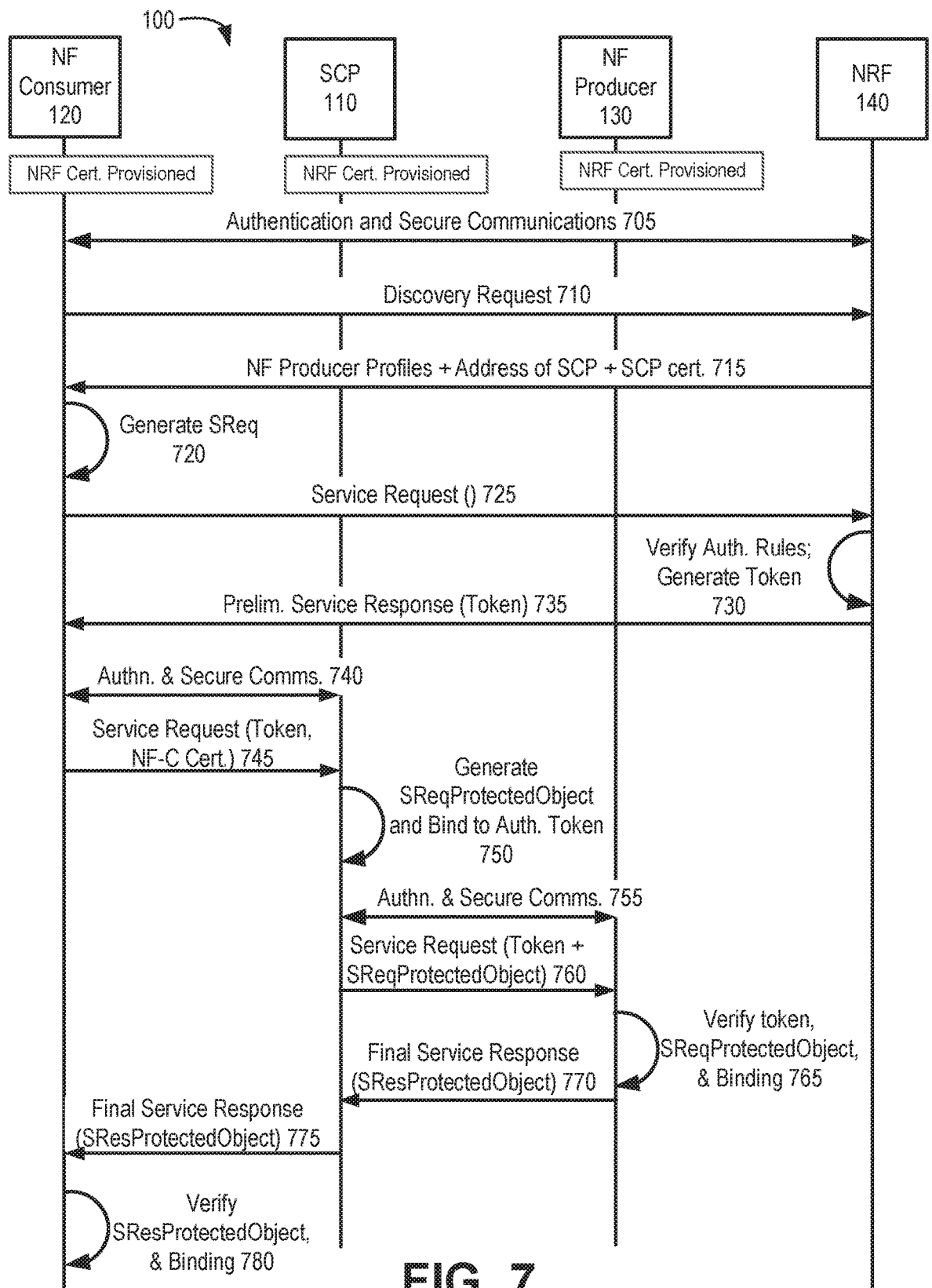

FIG. 7 is a signal flow diagram illustrating exemplary communications in network environment 100 to provide evidence of a service request, according to another implementation. In FIG. 7, SCP 110 generates and provides a proof-of-request and binds it with an authorization token. Similar to FIG. 3, assume in FIG. 7 that each of SCP 110, NF consumer 120, and NF producer 130 have been provisioned with an NRF certificate to enable cryptographic exchanges. Communications shown in FIG. 7 may provide simplified illustrations of communications in network environment 100 and are not intended to reflect every signal or communication exchanged between devices/functions.

As shown in FIG. 7, NF consumer 120 may initiate authentication and secure communications with NRF 140, as indicated at reference 705. After registration, NF consumer 120 may submit a discovery request 710 to NRF 140. In response to discovery request 710, NRF 140 may return a discovery response 715 including one or more NF producer profiles, a network address of an SCP 110, and an SCP certificate.

Upon receiving discovery response 715, NF consumer 120 may create a service request (SReq) message 720. NF consumer 120 may send the service request message to NRF 140, as indicated at reference 725. The NF consumer 120 may send the discovery request 710 message and may also include a service request message 725 to the NRF 140 as part of the same message instead of sending two separate messages. NRF 140 may receive service request 725. As shown at reference 730, NRF 140 may verify the authorization and policy rules and generate an authorization token. NRF 140 may include the token in a service response 735 directed to NF consumer 120.

Using information from discovery response 715, at reference 740, NF consumer 120 may initiate a TLS handshake to conduct authentication and establish secure communications with SCP 110. NF consumer 120 may submit a service request 745 to SCP 110. Service request 745 may include the "SReq Parmeters" and may also include the authentication token previously received from NRF 140, along with an NF consumer 120 certificate.

SCP 110 may receive service request 745. In response, SCP 110 may generate a proof-of-request on behalf of NF consumer 120 and may bind it to the authorization token. More particularly, as shown at reference 750, after optionally verifying the authentication token, SCP 110 may generate a hash of the service request (e.g., SReq 745) that may include the "SReq Parameters" and digitally sign the hash to generate a cryptographically signed service request object (SReqProtectedObject) using the SCP's 110 private key. The SCP 110 may bind the authorization token (e.g., from SReq 745) to the proof-of-request (e.g., SReqProtectedObject).

SCP 110 may, at reference 755, initiate a TLS handshake to conduct authentication and establish secure communications with NF producer 130. Acting as a proxy for NF consumer 120, SCP 110 may submit a service request 760 including the "SReq Parameters" received from the NF consumer 120 to NF producer 130. Service request 760 may also include the token and SReqProtectedObject generated at reference 750.

NF producer 130 may receive service request 760. NF producer 130 is able to verify that the proof-of-request was indeed created by NF consumer 120 by verifying the SCP's 110 120 digital signature and verifying the authorization token binding. More particularly, as shown at reference 765, NF producer 130 may verify the authenticity of the token, verify the SReqProtectedObject, verify the binding, and generate a signed service response object (SResProtectedObject) that is bound to the service request (e.g., SReq).

NF producer 130 may include the SResProtectedObject in a service response 770 directed to SCP 110. SCP 110 may receive service response 770 and may forward the service response 770 message within a service response 775, including the SResProtectedObject, to NF consumer 120. NF consumer 120 may receive service response 775 and may verify the SResProtectedObject for authenticity by using the NF producer's 130 digital certificate that is obtained as part of the service response message 775 and verify the binding, as shown in reference 780.

Thus, in the configuration of FIG. 7, a trusted SCP 110 creates a cryptographically signed service request object (SReqProtectedObject) which binds to the authorization token. SCP 110 sends the service request to NF producer 130 on behalf of NF consumer 120. The service request can be validated by NF producer 130.

Figure 8:
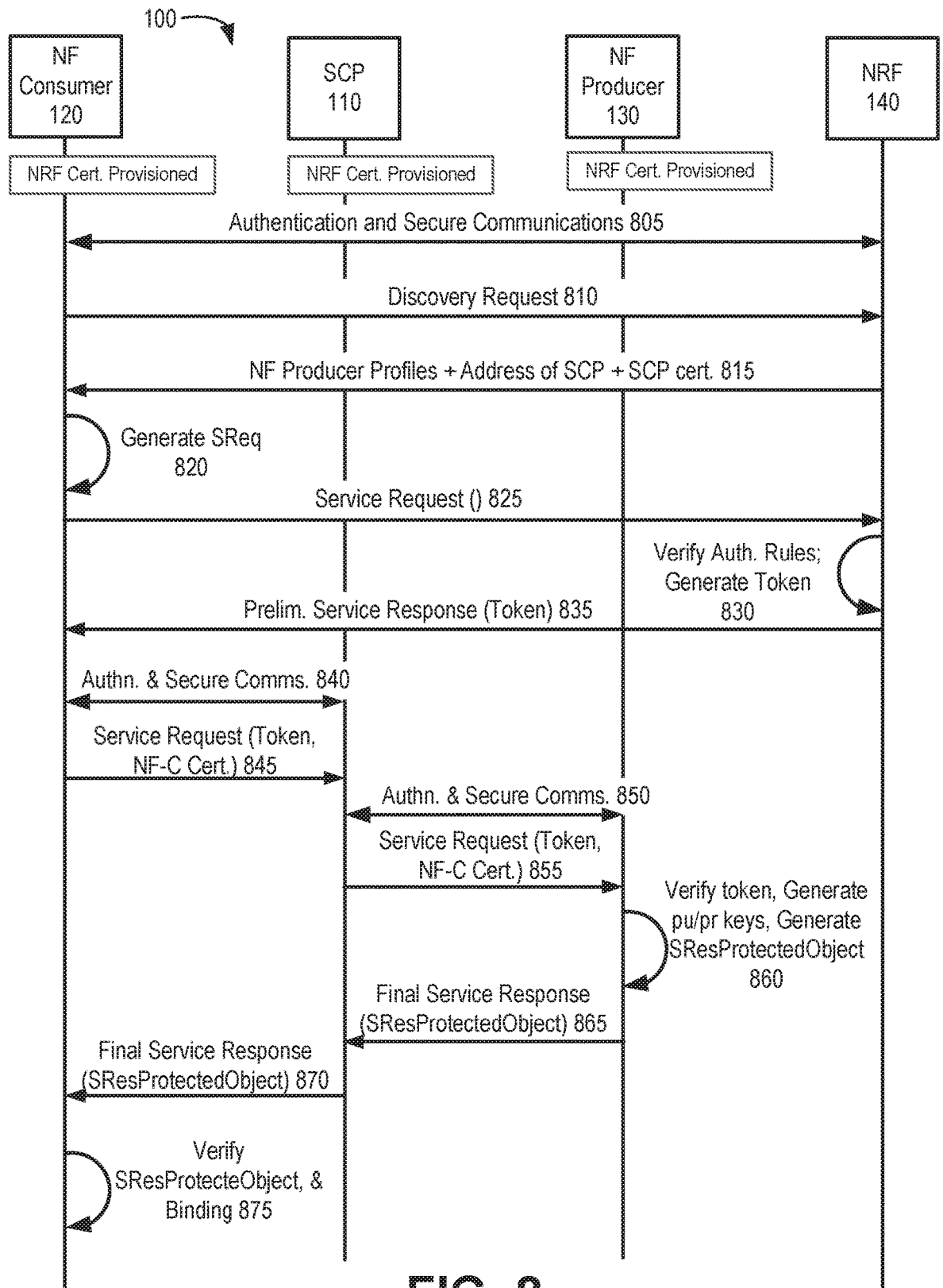

FIG. 8 is a signal flow diagram illustrating exemplary communications in network environment 100 to provide evidence of a service request, according to another implementation. In contrast with reliance on a trusted SCP 110 in FIG. 7, in FIG. 8, cryptographic access control is enforced by NF producer 130. Similar to FIG. 3, each of SCP 110, NF consumer 120, and NF producer 130 have been provisioned with an NRF certificate to enable cryptographic exchanges in the signal flow depicted in FIG. 8. Communications shown in FIG. 8 may provide simplified illustrations of communications in network environment 100 and are not intended to reflect every signal or communication exchanged between devices/functions.

As shown in FIG. 8, NF consumer 120 may initiate authentication and secure communications with NRF 140, as indicated at reference 805. After registration, NF consumer 120 may submit a discovery request 810 to NRF 140. In response to discovery request 810, NRF 140 may return a discovery response 815 including one or more NF producer profiles, a network address of one or more SCPs 110, and associated SCP certificate(s).

Upon receiving discovery response 815, NF consumer 120 may create a service request (SReq) message 820. NF consumer 120 may send the service request message to NRF 140, as indicated at reference 825. NRF 140 may receive service request 825. The NF consumer 120 may send the discovery request 810 message and may also include a service request message 825 to the NRF 140 as part of the same message instead of sending two separate messages. As shown at reference 830, NRF 140 may verify the authorization and policy rules and generate an authorization token. NRF 140 may include the token in a service response 835 directed to NF consumer 120.

Using information from discovery response 815, at reference 840, NF consumer 120 may initiate a TLS handshake to conduct authentication and establish secure communications with SCP 110. NF consumer 120 may submit a service request 845 to SCP 110. Service request 845 may include the SReq Parameters 405 and may also include the authorization token previously received from NRF 140, along with an NF consumer 120 certificate. In other implementations, service request 845 may also include SReqProtectedObject, as described above in connection with references 545 and 550 of FIG. 5.

SCP 110 may receive service request 845. Based on service request 845, SCP 110 may, at reference 850, initiate a TLS handshake to conduct authentication and establish secure communications with NF producer 130. Acting as a proxy for NF consumer 120, SCP 110 may submit a service request 855 to NF producer 130. Service request 855 may include the SReq Parameters 405, the token and the NF consumer 120 certificate. Service request 855 may also include the SReqProtectedObject, if provided by NF consumer 120.

NF producer 130 may receive service request 855. NF producer 130 is able to verify that the proof-of-request was indeed created by NF consumer 120 by verifying the NF consumer's 120 digital signature and verifying the authorization token binding. If the SReq Parameters indicated that the service response must be protected by having an appropriate value associated with the SRes Protection Flag, then the NF producer may inspect the SRes Protection Parameters to start generating and assembling the required cryptographic algorithms, credentials and keys required to generate the SResProtectedObject. If the SRes Protection Requesting Parameters indicated that one or more information elements have to be integrity protected and encrypted then the NF producer 130 may generate shared secrets using key agreement protocols that are used to encrypt and integrity protect a SResProtectedObject that only NF consumer 120 is able to decrypt. More particularly, as shown at reference 860, NF producer 130 may verify the authorization token and obtain a public key from the NF consumer's 120 certificate. NF producer 130 may generate ephemeral public/private keys and generate a shared secret using a key agreement algorithms using an ephemeral public key (e.g., EphPu) and the NF consumer 120's public key (NF_Pu) as inputs into the key agreement algorithm (e.g. ECIES). NF producer 130 may generate a service response messages containing the SRes Parameters, encrypt only the relevant information element(s) to create a SResEncryptedObject using the encryption key and the information elements within the SRes Parameters as inputs into an encryption algorithm (e.g. AES) and use the SRes Parameters as inputs to generate a message authentication code MAC to create a SResSignedObject using integrity protection key as input into the integrity protection algorithm (e.g. HMAC-SHA-256). The SResEncryptedObject and SResSignedObject may be generated using AEAD-class of algorithms, wherein only a single key may be used for both encryption and integrity protection. The SResEncryptedObject and the SResSignedObject are concatenated to create a protected SRes object (e.g., SResProtectedObject). A subset of the SRes Parameters (e.g. Target, Audience, Proxy Routing info—SCP FQDN, Algorithm and Crypto-specific parameters, Key-Id) may be unencrypted in order that the service response can be routed and processed by the SCP 110 and by the NF consumer 120.

NF producer 130 may include the SResProtectedObject in a service response 865 directed to SCP 110. SCP 110 may receive service response 865 and may forward the service response 870, including the SResProtectedObject and EphPu, to NF consumer 120. NF consumer 120 may receive service response 870 and may use EphPu and the NF consumer's private key (NF_Pr) to generate a shared secret. NF consumer 120 may then generate derivative keys to verify integrity and authenticity and encryption keys to perform decryption of one or more information elements within the SResProtectedObject, as shown in reference 875. The NF consumer 120 may optionally store the shared secret for future communications with the NF producer 130.

Figure 9:
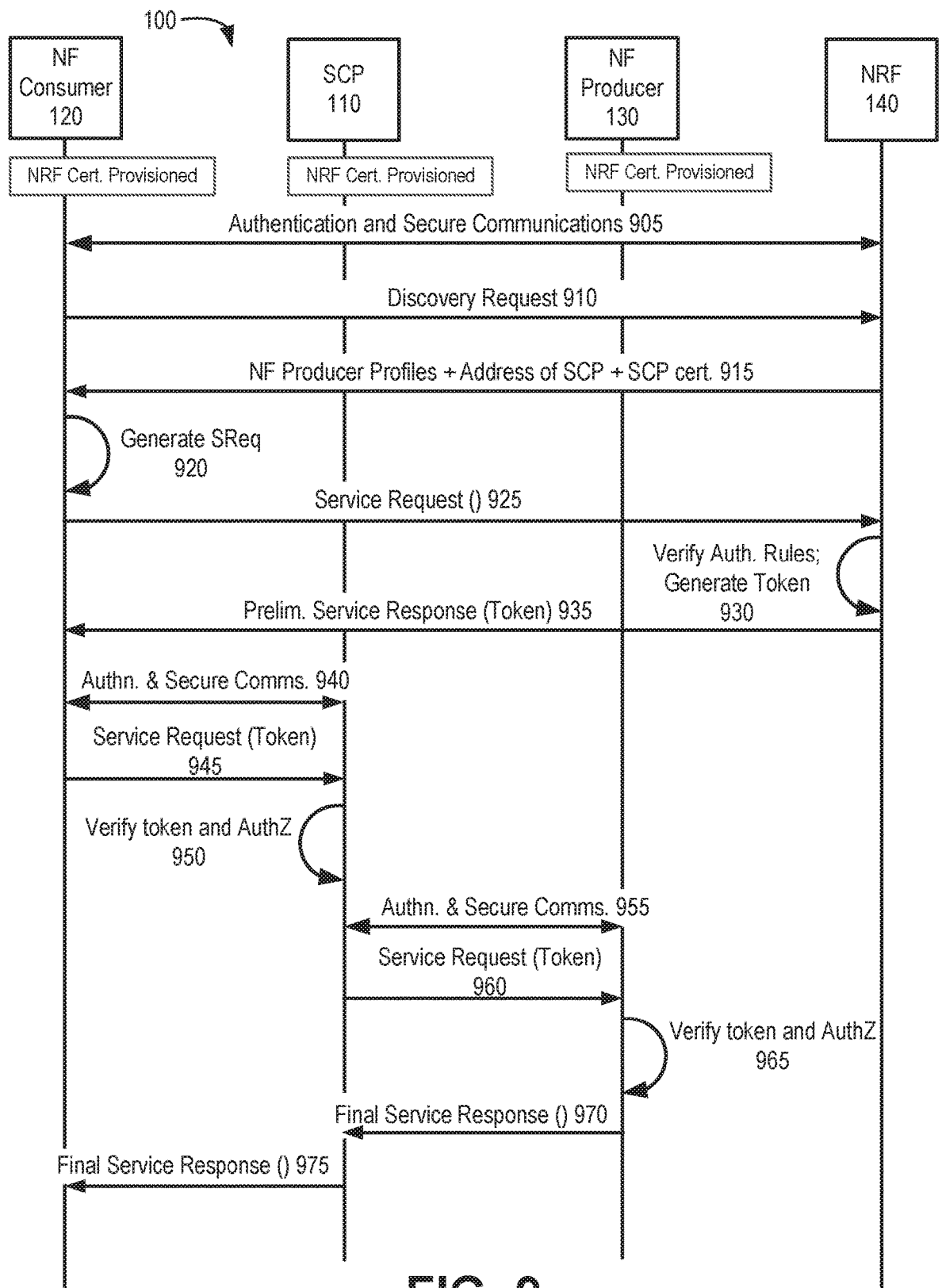

FIG. 9 is a signal flow diagram illustrating exemplary communications in network environment 100 to optimize secure service-based communications via an SCP, according to another implementation. In FIG. 9, SCP 110 is a trusted component. Similar to FIG. 3, each of SCP 110, NF consumer 120, and NF producer 130 have been provisioned with an NRF certificate to enable cryptographic exchanges in FIG. 9. Communications shown in FIG. 9 may provide simplified illustrations of communications in network environment 100 and are not intended to reflect every signal or communication exchanged between devices/functions.

As shown in FIG. 9, initial communications in references 905-940 may be similar to those described above in connection with references 805-840 of FIG. 8. At reference 945, NF consumer 120 may submit a service request 945 to SCP 110. Service request 945 may include an authorization token previously received from NRF 140. SCP 110 may optionally be configured to weed out service requests with expired or unauthorized tokens. Thus, at reference 950, SCP 110 may receive service request 945, and verify the token for timeliness and authorization.

SCP 110 may, at reference 955, initiate a TLS handshake to conduct authentication and establish secure communications with NF producer 130. Acting as a proxy for NF consumer 120, SCP 110 may submit the service request 960 to NF producer 130. Service request 960 may include the token (e.g., from service request 945) and the SReq Parameters 405.

If SCP 110 is not configured to weed out service requests at reference 950, NF producer 130 may be configured to weed out service requests with expired or unauthorized tokens. Thus, at reference 965, NF producer 130 may receive service request 960, and verify the token for timeliness and authorization. Assuming the token is valid, NF producer 130 may provide a service response 970 directed to SCP 110. SCP 110 may receive service response 970 and may submit a service response 975 to NF consumer 120. The SCP 110 may optionally verify if the service response received from the NF producer 130 is valid and timely. If the service response contained a SResProtectedObject, the SCP 110 may verify the authenticity and validity of the SResProtectedObject, by using the parameters within the service response message and the NF producer's 130 certificate and matching the service request message that contained the authorization token.

According to another embodiment of FIG. 9, discovery response 915 may include multiple NF profiles for different NF producers 130 and a list of multiple SCPs and SCP certificates to allow different SCPs 110 or NF producers 130 to verify and authorize service requests from NF consumer 120. According to still another embodiment, the verification at references 950 and/or 965 may be combined with other security procedures described above in the FIGS. 3 and 5-8.

Figure 10:
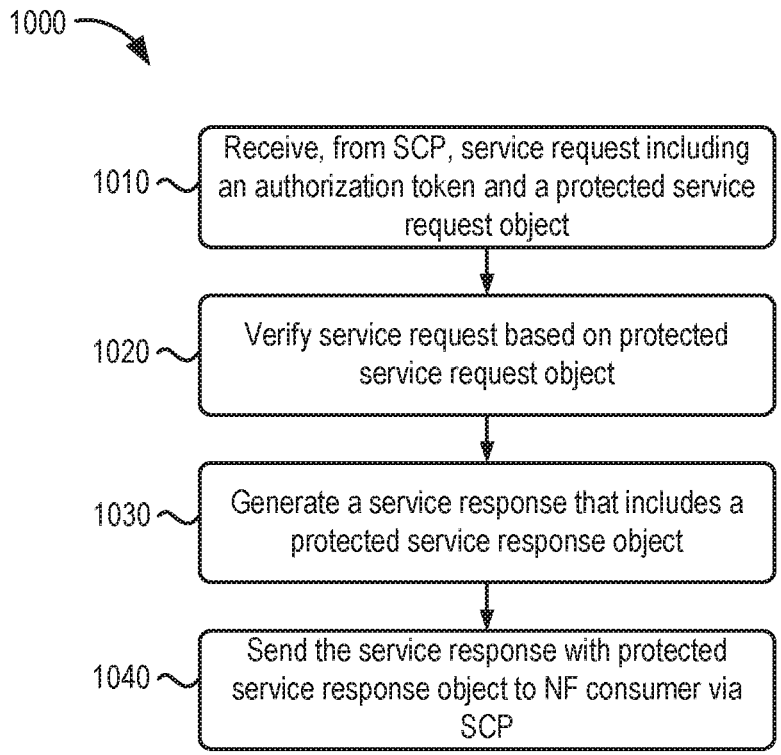
FIG. 10 is a flow diagram illustrating an exemplary process for providing evidence of a service request in a system using an SCP, according to an implementation described herein.

FIG. 10 is a flow diagram illustrating an exemplary process 1000 for providing evidence of a service request in a system using an SCP, according to an implementation described herein. In one implementation, process 1000 may be implemented by NF producer 130. In another implementation, process 1000 may be implemented by NF producer in conjunction with one or more other network elements in network environment 100.

Referring to FIG. 10, process 1000 may include receiving, from an SCP, a service request including an authorization token and a signed service request object (block 1010). For example, as described above in connection with FIG. 3, NF consumer 120 may submit a service request 345 to SCP 110. Service request 345 may include the SReq Parameters 405, the token and SReqProtectedObject previously received from NRF 140, along with an NF consumer 120 certificate. Based on service request 345, SCP 110 may, at reference 350, initiate a TLS handshake to conduct authentication and establish secure communications with NF producer 130. Acting as a proxy for NF consumer 120, SCP 110 may then submit and forward to NF producer 130 a service request 355 including the SReq Parameters 405, the token, SReqProtectedObject, and the NF consumer certificate. NF producer 130 may receive service request 355.

Process 1000 may further include verifying the service request based on the signed service request object (block 1020). For example, as described above in connection with FIG. 3, NF producer 130 can verify that the proof-of-request (e.g., the SReqProtectedObject) was indeed created by NF consumer 120 by using the SReq Parameters 405, verifying NF consumer's 120 digital signature associated with the SReqProtectedObject and verifying the authorization token binding. More particularly, NF producer 130 may verify the authenticity of the token, verify the SReqProtectedObject, and verify the binding.

Process 1000 may also include generating a service response that includes a signed service response object (block 1030), and sending the service response with signed service response object to an NF consumer via the SCP (block 1040). For example, assuming the service request is verified, NF producer 130 may generate a service response that includes a signed service response object (SResProtectedObject) Similar to the SReqProtectedObject, the SResProtectedObject may be generated using a hash of the service response parameters and a digital signature based on a private key of NF producer 130. NF producer 130 may include the SResProtectedObject in a service response 365 directed to SCP 110 that includes the NF producer's 130 certificate, which SCP 110 may forward to NF consumer 120. Thus, NF producer 130 provides an encrypted and signed object that contains the service response and that only NF Consumer 120 (that had requested the service) can decrypt. If the NF consumer 120 had requested for service that may require encryption of information elements or data, then the NF producer 130 may create a SResProtectedObject that provides encryption to the entire or only to sensitive information element(s) or data within the service response message in addition to integrity protection and authenticity to the entire service response parameters.

Systems and methods described herein enable explicit verification of NF consumer requests by an NF producer when using indirect communications by means of an SCP. The system and methods enable an NF producer to verify with a high degree of assurance that a legitimate and timely service request has been issued by a consumer. An NF producer can also ensure that only authorized NF consumers are able to obtain the services provided by that NF producer. Additionally, the systems and methods ensure confidentiality of sensitive data, which can only be decrypted by authorized NF consumers and appears as opaque object to the SCP or other unauthorized network entities.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, communications and encryption techniques described in connection with one of FIG. 3-9 may also be applicable to other Figures. Thus, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of signals and blocks have been described with regard to the processes illustrated in FIGS. 3-10, the order of the signals and blocks may be modified according to other embodiments. Further, non-dependent signals or blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 220, etc.), or a combination of hardware and software.

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 220) of a device. A non-transitory storage medium includes one or more of the storage mediums described in relation to memory 230.

To the extent the aforementioned embodiments collect, store or employ personal information of individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such. All structural and functional equivalents to the elements of the various aspects set forth in this disclosure that are known or later come to be known are expressly incorporated herein by reference and are intended to be encompassed by the claims.

What is claimed is:

1. A method, comprising:
   receiving, by a Network Repository Function (NRF) and from a Network Function (NF) consumer of a wireless core network, a discovery request;
   providing, by the NRF and based on the discovery request, a discovery response, wherein the discovery response includes a profile of an NF producer of the wireless core network, a network address of a Services Communications Proxy (SCP), and an SCP certificate, and wherein the NF consumer and the NF producer are provisioned with an NRF certificate;
   assembling, by the NF consumer, a service request based on the discovery response, wherein the service request contains one or more service request parameters;
   sending, by the NF consumer and to the NRF, the service request;
   sending, by the NRF and to the NF consumer, a preliminary service response including an authorization token with a signed service request object;
   forwarding, by the NF consumer, the service request with the authorization token and the signed service request object to the SCP;
   receiving, by the NF producer and via the SCP, the service request with the authorization token and the signed service request object;
   verifying, by the NF producer, the service request;
   generating, by the NF producer and after the verifying, a service response, wherein the service response includes a signed service response object that is based on both an encryption algorithm and an integrity protection algorithm; and
   sending, by the NF producer and to the NF consumer via the SCP, the service response with the signed service response object.

2. The method of claim 1, further comprising:
   initiating, by the NF consumer, a Transport Layer Security (TLS) handshake with the SCP.

3. The method of claim 1, further comprising:
   generating, by the NF consumer, the signed service request object, based on the service request, wherein the signed service request object includes a service request object generated from a hash value of parameters in the service request and a digital signature,
   wherein sending the service request includes sending the service request with the signed service request object,
   binding, by the NRF, the authorization token to the signed service request object.

4. The method of claim 1, further comprising:
   generating, by the NF consumer, the signed service request object, based on the service request and associated service request parameters, wherein the signed service request object includes a service request object generated from a hash value of the associated service request parameters and a digital signature; and
   binding, by the NF consumer, the authorization token to the signed service request object.

5. The method of claim 1, further comprising:
   receiving, by the NRF and from the NF consumer, the service request;
   generating, by the NRF, the signed service request object; and
   binding, by the NRF, the signed service request object to the authorization token.

6. The method of claim 1, further comprising:
   initiating, by the SCP, a Transport Layer Security (TLS) handshake with the NF producer to establish secure service-based communications.

7. The method of claim 1, wherein the signed service request object includes a service request object generated from a hash value of parameters in the service request and a digital signature by one of the NF consumer or the NRF.

8. The method of claim 1, wherein the signed service response object includes a service response object generated from a hash value of service response parameters in the service response and a digital signature by the NF producer.

9. The method of claim 1, wherein verifying the service request comprises:
   verifying authenticity of the authorization token, verifying the signed service request object, and verifying binding of the signed service request object to the authorization token.

10. The method of claim 1, further comprising:
    verifying, by the NF consumer, the signed service response object.

11. A system, comprising:
    a first network device including a first processor configured to execute instructions for a Network Function (NF) producer in a wireless core network;
    a second network device including a second processor configured to execute instructions for a Network Repository Function (NRF) in the wireless core network;
    a third network device including a third processor configured to execute instructions for a Services Communications Proxy (SCP) in the wireless core network; and
    a fourth network device including a fourth processor configured to execute instructions for a NF consumer in the wireless core network,
    wherein the NRF receives a discovery request from the NF consumer,
    wherein the NRF provides, based on the discovery request, a discovery response, the discovery response including a profile of an NF producer of the wireless core network, a network address of the SCP, and an SCP certificate, and wherein the NF consumer and the NF producer are provisioned with an NRF certificate;
    wherein the NF consumer assembles a service request based on the discovery response, the service request containing one or more service request parameters;
    wherein the NF consumer sends to the NRF the service request,
    wherein the NRF sends to the NF consumer a preliminary service response including an authorization token with a signed service request object,
    wherein the NF consumer forwards the service request with the authorization token and the signed service request object to the SCP,
    wherein the NF producer receives, via the SCP, the service request with the authorization token and the signed service request object,
    wherein the NF producer verifies the signed service request object;
    wherein the NF producer generates, after the verifying, a service response, wherein the service response includes a signed service response object that is based on both an encryption algorithm and an integrity protection algorithm; and
    wherein the NF producer sends, to the NF consumer and via the SCP, the service response with the signed service response object.

12. The system of claim 11, wherein the fourth processor is further configured to execute the instructions for the NF consumer to:
    initiate a Transport Layer Security (TLS) handshake with the SCP.

13. The system of claim 11, wherein the fourth processor is further configured to execute the instructions for the NF consumer configured to:
    generate the signed service request object, based on the service request, wherein the signed service request object includes a service request object generated from a hash value of parameters in the service request and a digital signature,
    wherein sending the service request includes sending the service request with the signed service request object.

14. The system of claim 11, wherein the fourth processor is further configured to execute the instructions for the NF consumer to:
    generate the signed service request object, based on the service request, wherein the signed service request object includes a service request object generated from a hash value of parameters in the service request and a digital signature; and
    bind the authorization token to the signed service request object.

15. The system of claim 11, wherein the second processor is further configured to execute the instructions to:
    receive, from the NF consumer, the service request;
    generate the signed service request object; and
    bind the signed service request object to the authorization token.

16. The system of claim 11, wherein, when verifying the service request, the first processor is further configured to execute the instructions to:
    verify authenticity of the authorization token,
    verify the signed service request object, and
    verify binding of the signed service request object to the authorization token.

17. The system of claim 11,
    wherein the signed service request object includes a service request object generated from a hash value of parameters in the service request and a digital signature by one of the NF consumer or the NRF, and
    wherein the signed service response object includes a service response object generated from a hash value of parameters in the service response and a digital signature by the NF producer.

18. A non-transitory computer-readable medium containing instructions executable by at least one processor, the computer-readable medium comprising one or more instructions for:
    sending, to a Network Repository Function (NRF) and by a Network Function (NF) consumer of a wireless core network, a discovery request;
    receiving, by the NF consumer, a discovery response to the discovery request, wherein the discovery response includes a profile of an NF producer of the wireless core network, a network address of a Services Communications Proxy (SCP), and an SCP certificate, and wherein the NF consumer and the NF producer are provisioned with an NRF certificate;
    assembling, by the NF consumer, a service request based on the discovery response, wherein the service request contains one or more service request parameters;
    sending, by the NF consumer and to the NRF, the service request;
    receiving, by the NF consumer and from the NRF, a preliminary service response including an authorization token with a signed service request object;
    forwarding, by the NF consumer, the service request with the authorization token and the signed service request object to the SCP;
    sending, to the NF and via the SCP, producer the service request with the authorization token and the signed service request object;
    receiving, from the NF producer and via the SCP, a service response, wherein the service response includes a signed service response object that is based on both an encryption algorithm and an integrity protection algorithm; and
    verifying the signed service request object.

19. The non-transitory computer-readable medium of claim 18, wherein the one or more instructions for verifying the signed service request object comprise instructions for:
    verifying authenticity of the authorization token,
    verifying a hash value of the signed service request object, and
    verifying binding of the signed service request object to the authorization token.

20. The non-transitory computer-readable medium of claim 18, wherein the signed service request object includes a service request object generated from a hash value of parameters in the service request and a digital signature by one of the NF consumer or the NRF.

* * * * *